E. H. TEN HOPEN.
FRICTION BRAKE.
APPLICATION FILED OCT. 26, 1907.

917,909.

Patented Apr. 13, 1909.

Witnesses
Vernon J. Lilly,
Georgiana Chace

Inventor
Edward H. Ten Hopen
By Luther V. Moulton
Attorney

UNITED STATES PATENT OFFICE.

EDWARD H. TEN HOPEN, OF GRAND RAPIDS, MICHIGAN.

FRICTION-BRAKE.

No. 917,909.　　　Specification of Letters Patent.　　　Patented April 13, 1909.

Application filed October 26, 1907. Serial No. 399,330.

*To all whom it may concern:*

Be it known that I, EDWARD H. TEN HOPEN, a citizen of the United States of America, residing at Grand Rapids, in the county of Kent and State of Michigan, have invented certain new and useful Improvements in Friction-Brakes; and I do hereby declare the following to be a full, clear, and exact description of the invention, such as will enable others skilled in the art to which it appertains to make and use the same.

Figure 1:
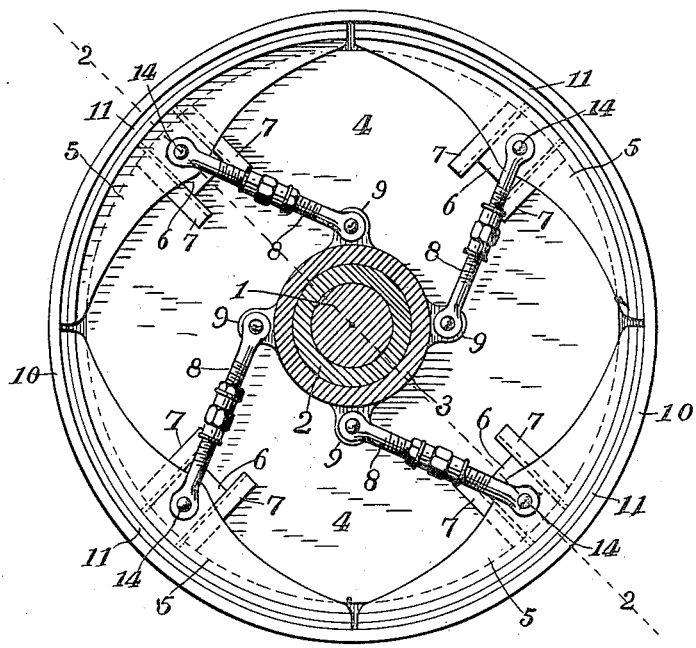
Figure 2:
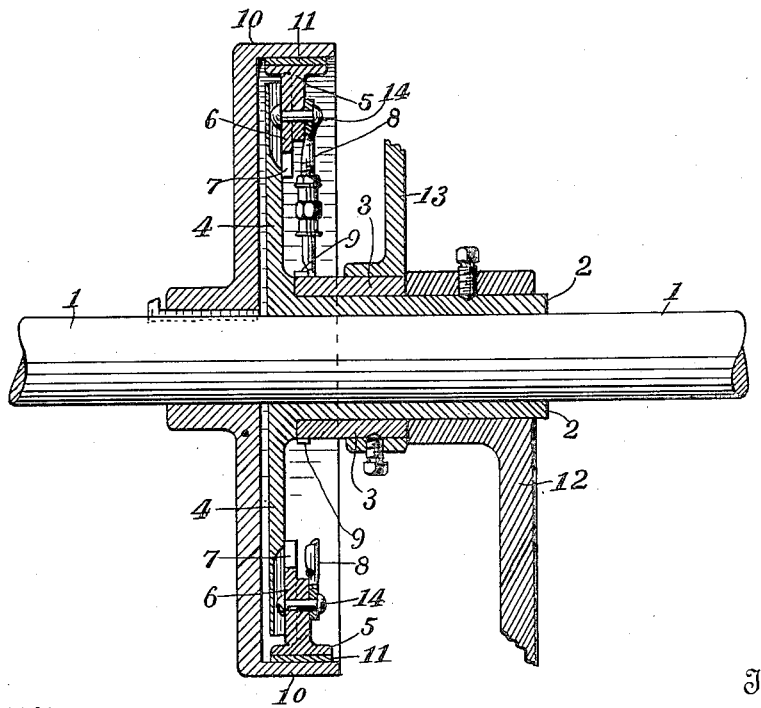

My invention relates to improvements in friction brakes, and its object is to provide the same with various new and useful features hereinafter more fully described and particularly pointed out in the claims, reference being had to the accompanying drawings, in which:

Figure 1. is an elevation of a device embodying my invention with parts omitted; and, Fig. 2. a section of the same on the line 2—2 of Fig. 1.

Like numbers refer to like parts in both of the figures.

1 represents a shaft on which the rotative member of the brake is mounted; 2 a stationary sleeve in which the shaft is rotative. On one end of this sleeve is fixed a disk 4 arranged within the overhanging rim 10 of the rotative member. Mounted on this disk are radially movable segments 5 adapted to frictionally engage the interior of the rim 10. These segments are preferably faced with fiber or leather on their outer surfaces as at 11 where they engage the rim 10. Each segment is provided with a slide 6 integral therewith, and radially movable in ways 7 integral with the disk 4 and oppositely engaging the respective edges of the slides 6. A rod 8 is pivotally connected to each segment, as at 14, and extends inward tangential to the circumference of the collar 3 and is pivotally attached to a lug 9 on the collar whereby as the collar is rotated in one direction, the segments are forced outward against the inner surface of the rim 10 and when rotated in the other direction, the segments are drawn inward and disengaged therefrom. The sleeve 2 is rigidly supported in any convenient hanger 12 and the collar 3 is rotated on the sleeve, and adjusted by means of any convenient lever 13.

What I claim is:

1. A friction brake comprising a rotative member having an overhanging rim, a fixed disk within the rim, a non-rotative sleeve supporting the disk, a collar rotative on the sleeve, a manually operated lever fixed on the collar to rotatively adjust the same, radially movable segments carried by the disk and engaging said rim, and means for connecting the segments and collar to radially adjust the segments.

2. In a friction brake, the combination of a fixed sleeve, a shaft rotative in the sleeve, a disk fixed on the sleeve, a rotative member mounted on the shaft and having a rim surrounding the disk, radially movable segments mounted on the disk and engaging the interior of the rim, a collar rotative on the sleeve, rods tangential to the collar and pivotally attached at their respective ends to the collar and to the segments, and means for rotatively adjusting the collar.

3. The combination of a fixed sleeve, a shaft rotative in the sleeve, a disk fixed on the sleeve, radial ways on the disk, a rotative member on the shaft and having a rim surrounding the disk, segments engaging the rim, slides radially movable in the ways and carrying the segments, a collar rotative on the sleeve, means for rotatively adjusting the collar, and rods tangential to the collar and pivoted at their respective ends to the collar and to the segments.

In testimony whereof I affix my signature in presence of two witnesses.

EDWARD H. TEN HOPEN.

Witnesses:
　PALMER A. JONES,
　LUTHER V. MOULTON.